United States Patent [19]
Rauch et al.

[11] 3,981,186
[45] Sept. 21, 1976

[54] DEVICE FOR BLOCKING AT A GIVEN TORQUE A ROTATING MACHINE DRIVEN BY A HYDRAULIC TURBINE

[75] Inventors: Philippe Rauch, Bosdarros; Jacques Tinchon, Lescar, both of France

[73] Assignee: Teleco Inc., Middletown, Conn.

[22] Filed: July 14, 1975

[21] Appl. No.: 595,509

[30] Foreign Application Priority Data
July 24, 1974    France .............................. 74.25618

[52] U.S. Cl. ........................................ 73/151; 192/7
[51] Int. Cl.² ........................................ E21B 47/00
[58] Field of Search ................. 73/155, 151, 133 R; 192/54, 70.23, 93 A, 7; 188/110, 1 R

[56] References Cited
UNITED STATES PATENTS
2,964,116   12/1960   Peterson ........................ 73/155 UX
3,756,076   9/1973   Quichaud et al. ..................... 73/151

Primary Examiner—Jerry W. Myracle

[57] ABSTRACT

This invention concerns a device to block at a given torque a rotating machine driven by a hydraulic or gas turbine.

The device comprises means of separating a driven disc from a driving disc, consisting of the insertion between the two discs of at least three balls or the like, which roll along three inclined cavities sloping in opposite directions when the longitudinal reaction resulting from the driven-shaft torque exceeds the force of a calibrated spring; these means co-operate with a disc brake fixed to the driven shaft, and which increases the driven-shaft torque.

This device is used in particular to block, outside operating periods, driven appliances connected with a hydraulic turbine operated by drilling mud in equipment at the bottom of wells to measure and transmit drilling parameters and characteristics.

5 Claims, 7 Drawing Figures

DEVICE FOR BLOCKING AT A GIVEN TORQUE A ROTATING MACHINE DRIVEN BY A HYDRAULIC TURBINE

This invention concerns the blocking of a rotating machine driven by a hydraulic turbine, at a given torque.

There already exist various types of torque limiters and engine-release systems, brought into operation by an increase in torque. However, they cannot simultaneously stop and block for reasons of safety the prime mover and driven appliances.

The device according to the invention allows this to be done, thereby meeting safety requirements and helping to restrict the functioning of rotating equipment only to periods when it is in fact needed.

The device can be used in mechanisms where the characteristic curve of the torque in relation to speed of rotation is a continuous decreasing function; this applies in particular to hydraulic or gas turbines, where this curve (Cm FIG. 1) is almost a straight line. Any increase in the driven-shaft torque Cr is known to tend to shift the operation point P of the mechanism in the direction from racing velocity Ve to zero velocity Vo.

In this device according to the invention for blocking at a given torque value the driven shaft of a rotating machine connected to a driving shaft actuated by a hydraulic or gas turbine, the adjoining ends of said drivin and driven shafts carry circular plates of equal dimensions, facing each other and cooperating with at least three rolling bodies of equal size which are arranged in uniformly spaced relationship between the two plates on a circle coaxial with the plates, said rolling bodies resting in an homologous manner in cavities consisting of the grooves that would be made by such a rolling body penetrating into each plate while moving in a direction parallel to the axis and at uniform velocity, when the plate revolves at uniform velocity, the direction of rotation of the driven plate, for the definition of these cavities, being opposite to the direction of rotation of the driving plate, a calibrated spring being provided which is integral and rotates with the driven shaft, and which biases the driven plate towards the driving plate, the driven shaft being equipped with at least one disc adapted to rotate integrally with said driven shaft, and facing a fixed disc, the material from which these moving and fixed discs are made being such that their surfaces retain a substantially uniform friction coefficient, regardless of wear.

In one embodiment, the rolling bodies provided between the plates consist of truncated cones, the apices of which lie on the common axis of the plates.

In another advantageous embodiment, the rolling bodies consist of balls.

In embodiments in which the blocking device cooperates with an appliance to measure a drilling parameter and transmit it, in coded form, by means of a mechanism to restrict the flow-rate of drilling mud, controlled by a servo-valvo fed by a hydraulic pump, stoppage of the supply to the servo-valve at the end of the measurement period causes an extra load on the hydraulic pump attached to the driven shaft, so that the driven shaft is displaced sufficiently so that the braking effect resulting from the contact between the discs causes a further increase in the driven-shaft torque, resulting in blocking of driving and driven shafts.

The above mentioned and further features of the invention will become apparent from the following description of one embodiment thereof given solely as an example, and with reference to the accompanying drawings, wherein.

Figure 1:
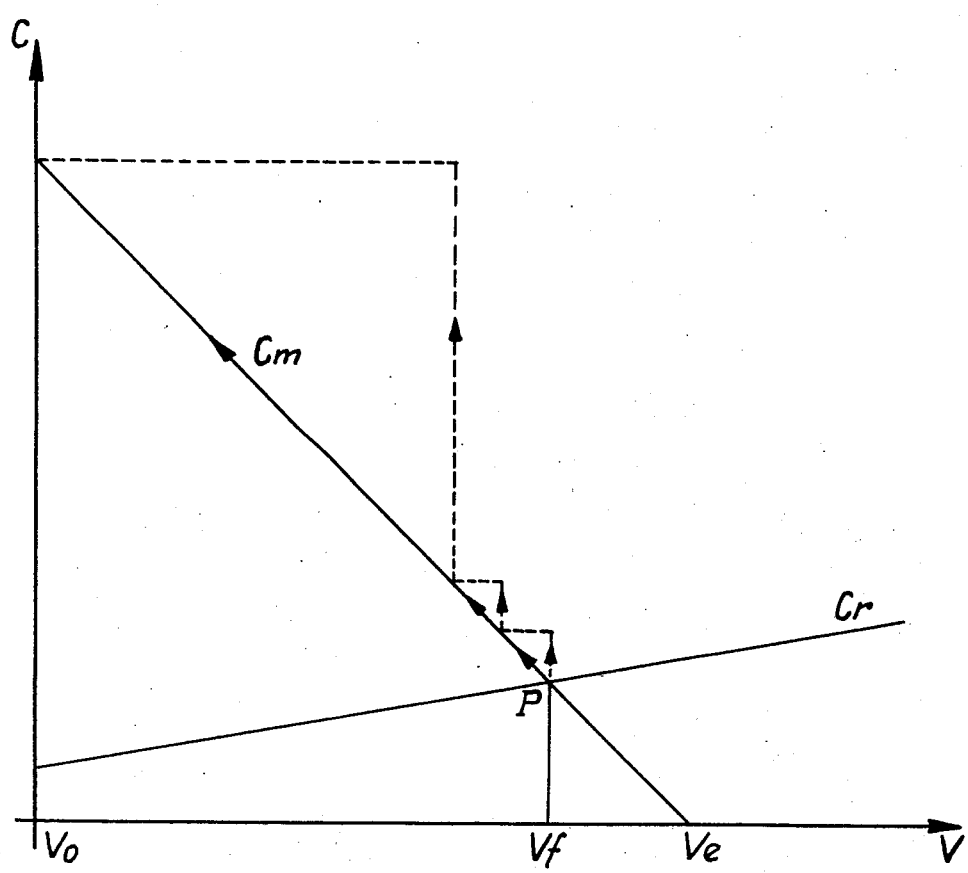
FIG. 1 is a graph showing a curve which represents the torque as a function of rotational speed.
Figure 2:
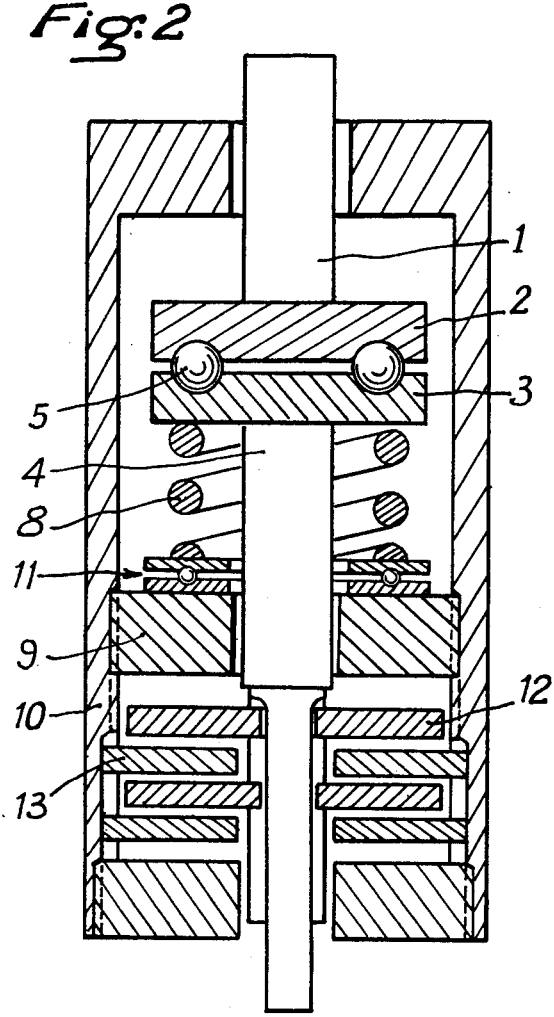
FIG. 2 is a cross section of the blocking device.
Figure 3A:
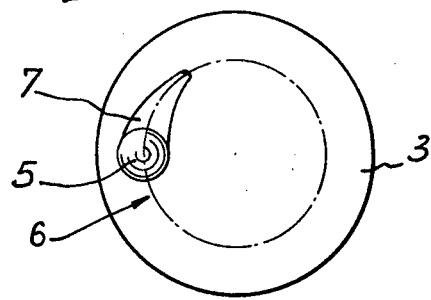
FIGS. 3a and 3b are detailed view of the plates.
Figure 3B:
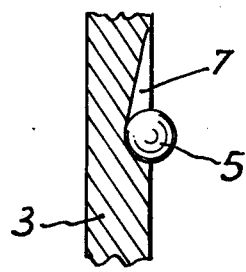

FIG. 2 shows a driving shaft 1, to the end of which a driving plate 2 is attached, faced by a plate 3 of the same size, attached to the end of driven shaft 4. Between these circular plates are inserted at least three equidistant balls or similar rolling bodies 5, located on a circle 6 concentric with the discs. These balls rest in a homologous way in cavities 7, as shown in FIGS. 3a and 3b. These cavities are grooves such as those made by a spherical ball of the same radius as a ball 5, penetrating into each disc while moving parallel to the axis and at uniform velocity, with the plate revolving at uniform velocity; the direction of rotation of the driven disc, for the definition of the configuration of these cavities, is opposite to the direction of rotation of the driving plate.

The driven plate 3 is pressed against the driving plate 2, with the interposed balls 5, by a spring 8, calibrated by means of a nut 9, which is screwed into the casing 10 containing the device; an abutment-member 11 is provided between the spring and the nut.

A coaxial disc 12, adapted to rotate integrally with the drive shaft 4, faces another disc 13, integral with the casing 10, and having a circular aperture for the driven shaft. These discs are made from a material that will ensure that their surfaces retain a constant friction coefficient, regardless of wear. The combination of discs 12 and 13 forms the first stage of a disc brake; the member of stages in which, consisting of alternately superimposed discs 12 connected to the shaft and discs 13 integral with the casing, depends on the axial reaction on the driven shaft 4, less the calibrated force of the spring, and/or on the torque to be absorbed during braking.

Figure 2A:
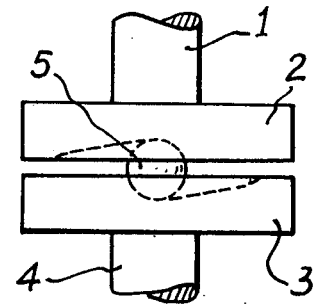
FIG. 2a is a detailed view of the driving and driven plates in a position wherein they are close to each other.

The device operates as follows. When the driven-shaft torque is less than a given value, axial reaction of the driven shaft is less than the calibrated force of the spring. The spring presses the driven plate against the driving plate, through the agency of the balls, which occupy the position of maximum penetration in their cavities in each plate (as shown in FIG. 2a).

Figure 2B:
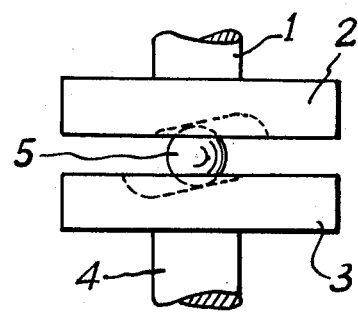
FIG. 2b is a detailed view of the driving and driven plates in a position wherein they are spaced from each other.

When the driven-shaft torque exceeds a given value, the axial reaction of the driven shaft rises above the calibrated force of the spring, and the driven shaft is displaced as a result of the extra axial reaction. An angular displacement develops between the two plates, and the balls 5 move along their cavities, in an homologous manner on each plate (as shown in FIG. 2b). As the driven shaft 4 moves longitudinally, the discs 12 come nearer the discs 13, and as they come into contact with them they increase the driven-shaft torque by producing a braking effect, which develops a driven-shaft torque that is constantly greater than the driving-torque, so that the rotational velocity of the turbine is reduced gradually to nil at which velocity the driving torque is at its maximum. The brake system is designed so that the total driven-shaft torque can exceed the maximum driving torque, namely the turbine-blocking torque.

When circulation of the driving fluid is halted, the driving torque becomes nil, reaction on the driven shaft 4 becomes nil, and the spring 8 pushes plate 3 towards plate 2, thereby releasing the brake.

Figure 4:
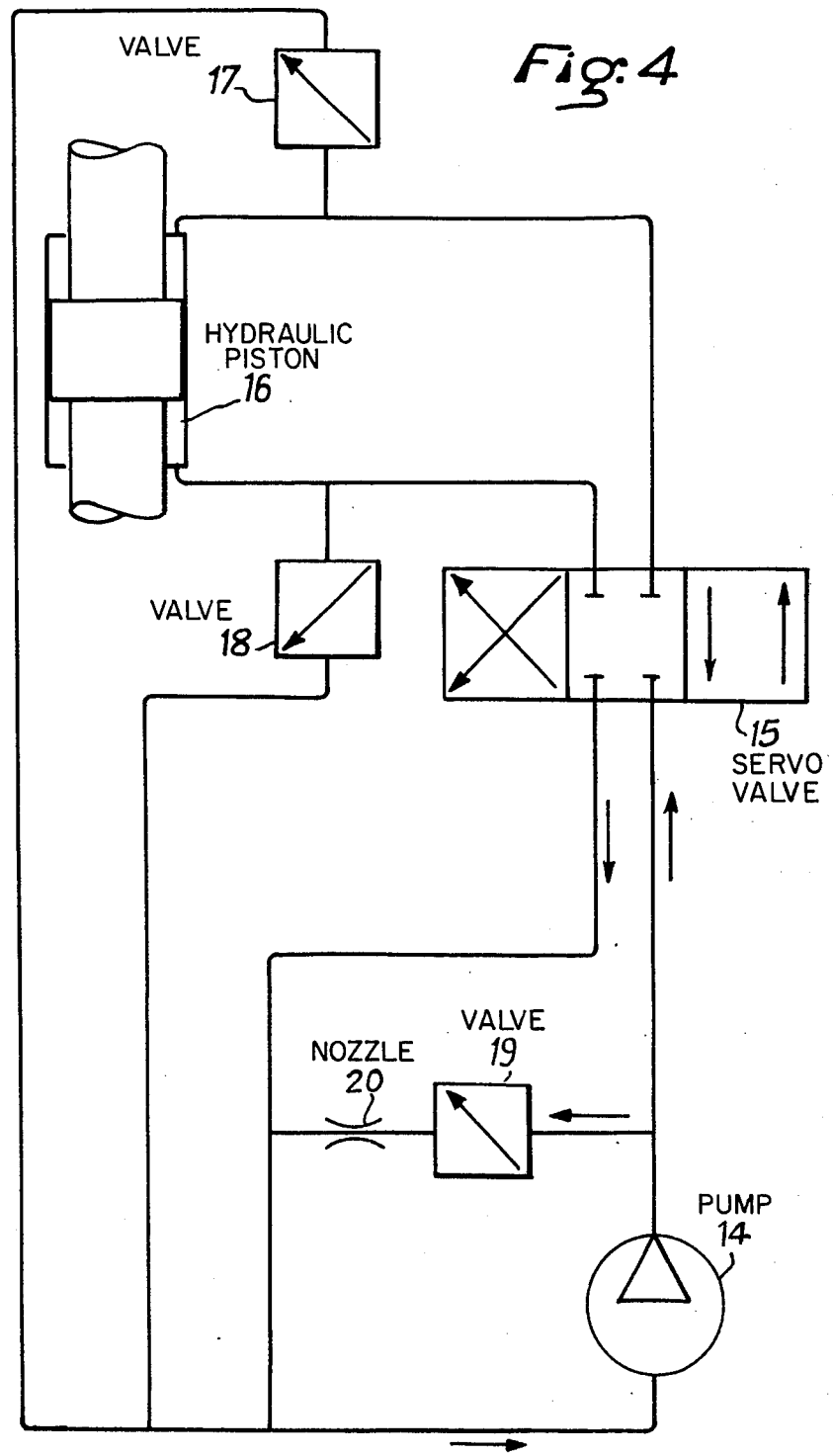
FIG. 4 is a diagrmmatical view of an installation to measure and transmit a drilling parameter.

FIG. 4 gives a diagrammatical view of an installation to block the rotating components of an appliance to measure a drilling parameter at the bottom of a well, and transmit it to the surface in coded form.

Movement of the hydraulic circuit oil is initiated by the pump 14, driven by a turbine (not shown here), powered by the drilling mud.

The oil in the hydraulic circuit is directed, by means of a servo-valve 15, alternately to either side of a jack 16, co-operating with an appliance to restrict the flow-rate of drilling mud (not shown here). The servo-valve is controlled by the measuring appliance (not shown here). The hydraulic circuit is completed by an oil-return pipe, connecting the servo-valve with the pump inlet.

There is a calibrated valve 17 on the oil pipe connecting the servo-valve with one side of the jack, and another calibrated valve 18 on the pipe connecting the servo-valve with the other side. These calibrated valves control the maximum oil inlet pressure to the jack, and the outlets of both valves are connected to the pump inlet.

The outlet and inlet of pump 14 are connected directly by a pipe comprising a calibrated valve 19 and fixed nozzle 20.

The installation illustrated in FIG. 4 operates as follows. During the period of measurement of the drilling parameter and its transmission, oil pressure is kept constant by means of the calibrated valve 17 or 18, and the torque on the pump shaft is accordingly also consant. When the measurement period has elapsed, the servo-valve closes, and a heavier load is imposed on the pump 14, because all the oil flows through the calibrated valve 19 and nozzle 20. This increase in the driven-shaft torque sets off the blocking process achieved by the device according to the instant invention.

The chronological order of an operating cycle of the appliance is as follows.

The appliance, included in the drill string, is lowered to the bottom of the well, and the driller starts up the mud pumps.

The turbine of the appliance starts up, moving within a certain period from zero velocity to an operating velocity of approximately 2,000 rpm.

From a velocity of rotation of approximately 1,000 rpm, while the alternator and electronic system operate normally, the servo-valve comes into operation.

An electronic clock then begins to measure a given period of time T; During T, the servo-valve continues to be fed, and the parameter measurement is transmitted by means 16 for restricting the flow-rate.

When T has elapsed, supply of the servo-valve is interrupted, and the oil flows through a circuit with larger pressure drops, so that from a certain flow-rate value, i.e. from a certain rotational velocity value, the delivery pressure requires a driving torque that results in operation of the brake, causing blocking.

Drilling then begins: the driller starts up rotation of the drill string, and the appliance remains blocked as long as the flow-rate of mud is maintained.

This new blocking device can be used to solve many problems, in particular those involving safety risks resulting from accidental overloading of machines, and to limit the duration of operation, in order to reduce wear and retain full reliability of the machines involved.

What is claimed is:

1. A device to block at a predetermined torque value the driven shaft of a rotating machine connected to a driving shaft, including:
    a driving shaft;
    a driven shaft;
    first plate means on said driving shaft having at least three cavities therein equidistantly spaced about said first plate means and penetrating into said first plate means in a first direction;
    second plate means on said drive shaft having at least three cavities therein equidistantly spaced about said second plate means and penetrating into said second plate means in a second direction opposed to said first direction of penetration in said first plate means;
    at least three rolling bodies between said first and second plate means, each rolling body being located in a homologous manner in a cavity in each of said first and second plate means;
    said cavities being grooves that would be made by penetration of one of said rolling bodies into each of said plate means while moving parallel to the axis of the plate means and at a uniform velocity and with each plate means rotating at a uniform velocity and in a direction opposite to the other;
    spring means for biasing said second plate means toward said first plate means, said spring means being rotatable with said driven shaft, said second plate means moving away from said first plate means at a predetermined torque load where the axial load on said driven shaft overcomes the biasing load of said spring means; and
    brake means for braking said driven shaft at a predetermined torque load, said brake means including at least one disc mounted on said driven shaft for rotation with said driven shaft, and at least one fixed disc facing said mounted disc for frictional engagement with said mounted disc upon movement of said second plate means away from said first plate means, the opposing surfaces of said fixed and mounted discs being of material to retain a substantially uniform friction coefficient regardless of wear.

2. A blocking device as in claim 1 wherein:
    the centers of said rolling bodies are located on a circle coaxial with the axis of rotation of each of said plate means.

3. A blocking device as in claim 2 wherein:
    each of said cavities is arcuate and extends along said circle.

4. A blocking device as in claim 1 wherein said brake means includes:
    a plurality of spaced discs mounted on said driven shaft; and a plurality of spaced fixed discs, each fixed disc facing a mounted disc for frictional engagement between pairs of the discs.

5. A blocking device as in claim 1 including:

hydraulic pump means connected to said driven shaft;

servo-valve means connected to receive fluid from said pump means;

hydraulic jack means connected to receive hydraulic fluid from said servo-valve means, said jack means being positioned in accordance with operating signals to said servo-valve means; and load means to increase the load on said pump means in accordance with the state of said servo-valve means to impose said predetermined torque load on said driven shaft to terminate rotation of said driven shaft and said driving shaft.

* * * * *

UNITED STATES PATENT OFFICE
CERTIFICATE OF CORRECTION

PATENT NO. : 3,981,186
DATED : September 21, 1976
INVENTOR(S) : Philippe Rauch et al It is certified that error appears in the above-identified patent and that said Letters Patent are hereby corrected as shown below:

Column 1, line 31, before and "drivin" should be --driving--

Column 1, line 61, "servo-volvo" should be --servo-valve--

Column 2, line 15, "view" should be --views--

Column 2, line 16, "diagrmmatical" should be --diagrammatical

Column 2, line 39, "drive" should be --driven--

Column 2, line 45, "member" should be --number--

Column 3, line 42, "sant" should be --stant--

Column 4, line 23 (Claim 1, line 10) "drive" should be --driven--

Please add the following claim;

CLAIM 6. A blocking device as in claim 1 wherein said rolling bodies consist of balls.

Signed and Sealed this

Fourteenth Day of December 1976

[SEAL]

Attest:

RUTH C. MASON
Attesting Officer

C. MARSHALL DANN
Commissioner of Patents and Trademarks